United States Patent
Drumheller et al.

(10) Patent No.: US 8,270,251 B2
(45) Date of Patent: Sep. 18, 2012

(54) ACOUSTIC ISOLATOR

(75) Inventors: Douglas S. Drumheller, Cedar Crest, NM (US); Paul L. Camwell, Calgary (CA); Anthony R. Dopf, Calgary (CA); Derek W. Logan, Calgary (CA)

(73) Assignee: XACT Downhole Telemetry Inc., Calgary, Alberta (CA)

( * ) Notice: Subject to any disclaimer, the term of this patent is extended or adjusted under 35 U.S.C. 154(b) by 393 days.

(21) Appl. No.: 12/645,353

(22) Filed: Dec. 22, 2009

(65) Prior Publication Data

US 2010/0157741 A1    Jun. 24, 2010

Related U.S. Application Data

(63) Continuation-in-part of application No. 11/606,818, filed on Dec. 1, 2006, now abandoned.

(60) Provisional application No. 60/741,907, filed on Dec. 5, 2005.

(51) Int. Cl.
    *E21B 47/12*    (2012.01)
(52) U.S. Cl. .................. 367/82; 181/102; 340/854.4
(58) Field of Classification Search ............... 367/81, 367/82; 181/102; 340/854.4
    See application file for complete search history.

(56) References Cited

U.S. PATENT DOCUMENTS

| | | | |
|---|---|---|---|
| 3,381,267 A | 4/1968 | Cubberly, Jr. et al. | |
| 4,001,773 A | 1/1977 | Lamel et al. | |
| 4,166,967 A | 9/1979 | Benes et al. | |
| 4,314,365 A | 2/1982 | Petersen et al. | |
| 5,128,902 A | 7/1992 | Spinnler | |
| 5,289,433 A | 2/1994 | Cowles et al. | |
| 5,343,001 A | 8/1994 | Cowles et al. | |
| H1445 H | 6/1995 | Culbreath et al. | |
| 5,437,194 A | 8/1995 | Lynnworth | |
| 5,510,582 A | 4/1996 | Birchak et al. | |
| 5,515,733 A | 5/1996 | Lynnworth | |
| 5,592,438 A * | 1/1997 | Rorden et al. | 367/83 |
| 5,629,906 A | 5/1997 | Sudol et al. | |
| 5,646,583 A | 7/1997 | Seabury et al. | |
| 5,728,978 A | 3/1998 | Roberts et al. | |
| 6,082,484 A * | 7/2000 | Molz et al. | 181/102 |
| 6,535,458 B2 * | 3/2003 | Meehan | 367/81 |
| 6,603,241 B1 | 8/2003 | Barber et al. | |

(Continued)

OTHER PUBLICATIONS

Barnes et al., "Passbands for Acoustic Transmission in an Idealized Drill String," *J. Acoust. Soc. Am.*, 51(5):1606-1608, 1972.

(Continued)

*Primary Examiner* — Ian Lobo
(74) *Attorney, Agent, or Firm* — Klarquist Sparkman, LLP (57) ABSTRACT

An acoustic isolator for use with tubular assemblies such as drillpipe or production tubing comprising an acoustic wave transmitter, the acoustic isolator comprising, in series connection, an odd integer λ/4 multiple tuning bar of first acoustic impedance adjacent the acoustic wave transmitter, an odd integer λ/4 multiple reflector tube of second acoustic impedance, and a snubber of third acoustic impedance, wherein there is an acoustic impedance mismatch between the odd integer λ/4 multiple tuning bar and the odd integer λ/4 multiple reflector tube and an acoustic impedance mismatch between the odd integer λ/4 multiple reflector tube and snubber, such that a 'down' wave propagated toward the isolator is reflected back substantially in phase with an 'up' wave propagated from the acoustic wave source away from the isolator. Furthermore, the acoustic isolator is similarly effective in reflecting 'up' propagating waves originating from below the isolator, hence further protecting the acoustic wave source from possible deleterious interference.

17 Claims, 6 Drawing Sheets

U.S. PATENT DOCUMENTS

| | | | |
|---|---|---|---|
| 6,820,716 B2 * | 11/2004 | Redding et al. | 181/106 |
| 6,834,743 B2 | 12/2004 | Arian et al. | |
| 6,841,922 B2 | 1/2005 | Aigner et al. | |
| 7,032,707 B2 * | 4/2006 | Egerev et al. | 181/102 |
| 7,138,889 B2 | 11/2006 | Lakin | |
| 7,210,555 B2 | 5/2007 | Shah et al | |
| 7,439,656 B2 | 10/2008 | Ossmann | |
| 2003/0106739 A1 | 6/2003 | Arian et al. | |
| 2006/0000665 A1 | 1/2006 | Shah et al. | |
| 2006/0151179 A1 | 7/2006 | Boyadjieff et al. | |
| 2009/0003133 A1 * | 1/2009 | Dalton et al. | 367/82 |

OTHER PUBLICATIONS

Bedford, et al., "Introduction to Elastic Wave Propagation," Chichester: Willey, pp. 73-82, 1994.

Brekhovskikh, "Waves in Layered Media,"Second Edition, Published by Academic Press Inc., pp. 5-20, 1980.

D. S. Drumheller, "Acoustical Properties of Drill Strings," *J. Acoust. Soc. Am.*, 85(3):1048-1064, 1989.

D. S. Drumheller, "Extensional Stress Waves in One-Dimensional Elastic Waveguides," *J. Acoust. Soc. Am.*, 92(6):3389-3402, 1992.

D. S. Drumheller, "Attenuation of Sound Waves in Drill Strings," *J. Acoust. Soc. Am.*, 94(4):2387-2396, 1993.

Drumheller et al., "The propagation of Sound Waves in Drill Strings," *J. Acoust. Soc. Am.*, 97(4):2116-2125, 1995.

D. S. Drumheller, "Introduction to Wave Propagation in Nonlinear Fluids and Solids," Cambridge University Press, Cambridge, pp. 480-485, 1998.

D. S. Drumheller, "Wave Impedances of Drill Strings and Other Periodic Media," *J. Acoust. Soc. Am.*, 112(6):2527-2539, 2002.

Office Action from the United States Patent & Trademark Office in co-pending U.S. Appl. No. 11/606,818, dated Mar. 24, 2010.

* cited by examiner

ACOUSTIC ISOLATOR

CROSS REFERENCE TO RELATED APPLICATIONS

The present application is a continuation-in-part of U.S. application Ser. No. 11/606,818, filed Dec. 1, 2006, now abandoned which claims the benefit of U.S. Provisional application No. 60/741,907, filed Dec. 5, 2005. Application Ser. Nos. 11/606,818 and 60/741,907 are incorporated herein by reference.

FIELD OF THE INVENTION

The present invention relates to telemetry apparatus and methods, and more particularly to acoustic telemetry apparatus and methods used in the oil and gas industry.

BACKGROUND OF THE INVENTION

Acoustic telemetry is a method of communication in the well drilling and production industry. In a typical drilling environment, acoustic carrier waves from an acoustic telemetry device are modulated in order to carry information via the drillpipe to the surface. Upon arrival at the surface, the waves are detected, decoded and displayed in order that drillers, geologists and others helping steer or control the well are provided with drilling and formation data.

The theory of acoustic telemetry as applied to communication along drillstrings has a long history, and a comprehensive theoretical understanding was eventually achieved and backed up by accurate measurements. It is now generally recognized that the nearly regular periodic structure of drillpipe imposes a passband/stopband structure on the frequency response, similar to that of a comb filter. Dispersion, phase non-linearity and frequency-dependent attenuation make drillpipe a challenging medium for telemetry, which situation is made even more challenging by the significant surface and downhole noise generally experienced.

The design of acoustic systems for static production wells has been reasonably successful, as each system can be modified within economic constraints to suit these relatively long-lived applications. The application of acoustic telemetry in the plethora of individually differing real-time drilling situations, however, is much less successful. This is primarily due to the increased noise due to drilling, and the problem of unwanted acoustic wave reflections associated with downhole components, such as the bottom-hole assembly (or 'BHA'), typically attached to the end of the drillstring, which reflections can interfere with the desired acoustic telemetry signal. The problem of communication through drillpipe is further complicated by the fact that drillpipe has heavier tool joints than production tubing, resulting in broader stopbands; this entails relatively less available acoustic passband spectrum, making the problems of noise and signal distortion more severe.

To make the situation even more challenging, BHA components are normally designed without any regard to acoustic telemetry applications, enhancing the risk of unwanted and possibly deleterious reflections caused primarily by the BHA components.

When exploring for oil or gas, or in coal mine drilling applications, an acoustic transmitter is preferentially placed near the BHA, typically near the drill bit where the transmitter can gather certain drilling and formation data, process this data, and then convert the data into a signal to be broadcast to an appropriate receiving and decoding station. In some systems, the transmitter is designed to produce elastic extensional stress waves that propagate through the drillstring to the surface, where the waves are detected by sensors, such as accelerometers, attached to the drill string or associated drilling rig equipment. These waves carry information of value to the drillers and others who are responsible for steering the well.

Exploration drilling in particular has become a highly evolved art, wherein the specification and placement of the BHA components is almost entirely dictated by the driller's need to drill as quickly and accurately as possible while gathering information local to the drill bit. A large variety of specialized BHA modules or tools are available to suit local conditions, and their inclusion in a BHA usually takes priority over the requirements of telemetry methods, acoustic or otherwise. The diversity of these BHA tools and the decision regarding whether or not to even include them in a drillstring pose major issues for consideration; these issues have a significant impact when dealing with acoustic energy questions. Cyclic acoustic waves suffer multiple reflections and amplitude changes even in a very simple BHA, and the net effect of these changes may destructively interfere with the required acoustic telemetry broadcast signal. The reflections are caused by impedance mismatches, which are the result of mechanical discontinuities present in all BHAs presently in use.

An initial response to this problem would be to place the acoustic telemetry device above the BHA and simply direct the acoustic energy up the drillstring, away from the BHA components. Unfortunately, this does not fully address the problem because typical acoustic transmitters emit waves of equal magnitude both up-hole and downhole, and the downward travelling waves in particular may be reflected resulting in destructive interference with the upward travelling waves. In the worst cases, this can cause virtually complete cancellation of the upward travelling communication signal.

It is known in other fields, for example in radio frequency transmitter design and electrical transmission lines, that wave reflections can be controlled by inserting simple specific impedance changes at certain distances from a transmitter, such that the combination of the original wave and the reflected wave combine constructively to produce a single wave travelling in one direction with increased amplitude. The appropriate technique in our context is to insert a 'quarter wave' ($\lambda/4$, $\lambda$ being a wavelength) impedance change (or odd integer multiples thereof, i.e. $n_{odd}\lambda/4$) adjacent to the transmitter so that one wave (the 'down' wave) is reflected in phase with the intended transmitted wave (the 'up' wave) and constructively aids the intended transmitted wave by increasing its amplitude.

Downhole applications typically employ transmitters that emit stress waves of nearly equal, but not necessarily equal, magnitude in both directions. Moreover, each wave has the same sign in stress but opposite sign in material velocity. In such cases, the appropriate reflection device would be a $n_{odd}\lambda/4$ tuning bar placed below the transmitter. However, such a simple solution is often impractical because the equipment below the acoustic transmitter is designed to drill and steer the well rather than to aid telemetry. Equipment such as drill collars, crossover pipes, drilling motors and bits can easily nullify the benefit of simply introducing a $n_{odd}\lambda/4$ section of pipe below the acoustic transmitter because the equipment will generally be of differing lengths and impedances that can add to the $n_{odd}\lambda/4$ section and eliminate the intended benefit.

Other styles of transmitters, which emit waves in both directions having different relationships between their stresses and material velocity, would require tuning bars of different lengths, not necessarily $n_{odd}\lambda/4$ sections, further complicating the problem.

As mentioned above, downhole noise is also of concern in acoustic telemetry. The problem of downhole noise is addressed to some extent in U.S. Pat. No. 6,535,458 to Meehan, wherein is taught a baffle filter comprising a periodic structure of typically 20 m length interposed above or below the acoustic sub; this is intended to cause stopbands over a certain range of frequencies, the position of the baffle being to protect the acoustic transmitter from the sources of the noise. This teaching, however, does not address or anticipate the more serious problem of energy propagating in a 'down' direction being reflected in a relatively unattenuated manner back to the transmitter where it may combine in a destructive manner with the energy propagating in an 'up' direction, thereby causing possibly significant destruction of the signal intended to reach the surface.

As can be seen, then, the required upward travelling acoustic telemetry waves are often interfered with by unwanted reflections from impedance mismatches below the transmitter. The known art of inserting a tuning bar of appropriate length is usually ineffective because the local conditions often necessitate the addition of further BHA components that cause further reflections that can often destructively interfere with the upward travelling wave.

SUMMARY OF THE INVENTION

It is an object of the present invention to control down wave reflections, in particular, in such a manner as to mitigate the otherwise potentially destructive reflections from interfering with the up wave.

According to one aspect of the invention, there is provided an acoustic isolator for use with tubular assemblies comprising an acoustic wave transmitter. The acoustic isolator comprises the following components in series connection: a first tubular member of a first acoustic impedance connectable adjacent to the acoustic wave transmitter and having a length that is an odd multiple of a quarter wavelength ($\lambda/4$) of a representative acoustic wave; a second tubular member of a second acoustic impedance that is less than the first acoustic impedance and having a length that is an odd multiple of a quarter wavelength $\lambda/4$ of the representative acoustic wave; and a third tubular member of a third acoustic impedance that is greater than the second acoustic impedance. In operation, a first wave propagated by the transmitter toward the first tubular member is reflected back substantially in phase with a second wave propagated at the same time by the transmitter away from the first tubular member.

The acoustic impedances of the first and third tubular members can be substantially equal. Alternatively, the third acoustic impedance can be substantially different than the first acoustic impedance.

The tubular assemblies can be a part of a downhole drillstring, in which case the acoustic wave transmitter is for acoustic telemetry, the first tubular member is a tuning bar, the second tubular member is a reflector tube, and the third tubular member is a snubber. In this application, the reflector tube can be composed of a material that has a lower density than the material composing the tuning bar. Particularly, the reflector tube composition can include titanium and the tuning bar can comprise a steel drill collar. Alternatively, the reflector tube can have a smaller wall cross sectional area than the tuning bar; particularly, the tuning bar can comprise a steel drill collar, and the reflector tube can have a composition that includes steel and has a smaller wall cross-sectional area than the tuning bar, thereby providing the reflector tube with a lesser acoustic impedance than the tuning bar. Alternatively, the tuning bar can comprise a steel drill collar, and the reflector tube has both a composition that is of lower density than steel and a smaller wall cross sectional area than the tuning bar, thereby providing the reflector tube with a lesser acoustic impedance than the tuning bar.

The snubber can have a length shorter than $\lambda/4$ of the representative acoustic wave. Further, the snubber can comprise a steel drill collar of the same composition and wall thickness as the tuning bar. The tuning bar can comprise a steel drill collar and the reflector tube can have a composition that includes steel and can have a smaller wall cross-sectional area than the tuning bar, and the snubber can have a composition that includes steel and lead or a material with similarly or higher density than lead thereby providing the snubber with a higher acoustic impedance than the reflector tube.

Alternatively, the tubular assemblies can be part of coiled tubing for shallow well drilling, in which case the acoustic wave transmitter is for acoustic telemetry, the first tubular member is a tuning bar, the second tubular member is a reflector tube, and the third tubular member is a snubber. In yet another alternative, the tubular assemblies are pipes used in production wells, in which case the acoustic wave transmitter is for acoustic telemetry, the first tubular member is a tuning bar, the second tubular member is a reflector tube, and the third tubular member is a snubber.

Typical acoustic transmitters presently being placed in drillstrings or production tubing generate upward periodic travelling waves and similar downward travelling periodic waves. The teaching herein is limited to the most common situation, in which the stresses (or tractions) of the upward and downward waves are in phase while the material velocities are 180° out of phase, but it is to be recognized that the present invention is easily applied to situations in which these two waves have different phase relationships, and the implementation of the present invention would simply require the application of tuning bar lengths that differ from $n_{odd}\lambda/4$.

A detailed description of an exemplary embodiment of the present invention is given in the following. It is to be understood, however, that the invention is not to be construed as limited to this embodiment.

BRIEF DESCRIPTION OF THE DRAWINGS

In the accompanying drawings, which illustrate the principles of the present invention and an exemplary embodiment thereof.

DETAILED DESCRIPTION OF A PREFERRED EMBODIMENT

Embodiments of the present invention comprise an acoustic isolator apparatus for placement below a transmitter that emits an acoustic wave of wavelength $\lambda$, and a method for using same, that will beneficially reflect down waves emitted from the transmitter. In some embodiments:

A. the apparatus can be configured to be effective over a certain broadcast bandwidth, such that all the desired frequencies in a modulated telemetry signal are significantly and beneficially reflected at known places; and B. the apparatus aids the up wave by adding in phase, providing up to a 3 dB gain in the wave amplitude and a 6 dB gain in the wave energy.

An apparatus according to embodiments of the present invention seeks to effectively isolate down waves from the subsequent BHA components, thus curtailing the possibility of waves that would have entered the BHA and returned with potentially destructive phases. Positioning an apparatus according to embodiments of the present invention below the transmitter can, in effect, make the lower BHA components usefully 'acoustically invisible' over a bandwidth useful for acoustic telemetry.

Other embodiments of the present invention can be made applicable in situations other than real-time drilling with drillpipe or production wells with production tubing. For example, many relatively shallow wells are drilled with coiled tubing. Although coiled tubing does not have the passband/stopband features of drillpipe, it does have BHA components similar to those in jointed pipe applications. Thus, the apparatus and method taught herein are intended to apply equally to the situation of coiled tubing.

It is intended that yet other embodiments of the present invention be applicable in still further applications. For example, an isolation/reflection means as described herein can also be beneficial in production wells where there may not be a BHA as such, but there may instead be production components such as valves, manifolds, screens, gas lift equipment, etc., below the acoustic source. Thus, the apparatus and method taught herein are intended to apply equally to this situation.

It is not intended that an exhaustive list of all such applications be provided herein in this description of some embodiments of the present invention, as many further applications will be evident to those skilled in the art in light of this description.

In the following description, reference is made to 'up' and 'down' waves, but this is merely for convenience and clarity. It is to be understood that the present invention is not to be limited in this manner to conceptually simple applications in acoustic communication from the downhole end of the drillstring upward to the surface. It will be readily apparent to one skilled in the art that the present invention applies equally, for example, to subsurface stations, such as would be found in telemetry repeaters.

The focus of the present embodiments is to understand and implement designs of tubular members (pipes of various types) such that judicious control of their impedances may result in a useful and necessary apparatus, an acoustic isolator.

As waves travel through pipe they create both tractive forces and motion in the material. The tractive force, or simply traction, is equal to the axial stress times the cross-sectional area. Positive and negative tractions mean that the material is either in tension or compression, respectively. The parameter called the acoustic impedance z is important as it is a proportionality constant that connects the traction to the velocity of the material produced by simple waves propagating up and down the pipe. The acoustic impedance z of a section of pipe is $$z = \rho c A, \quad [1]$$

where $\rho$=material mass density
c=bar wave velocity
A=wall area of the pipe.

Figure 1:
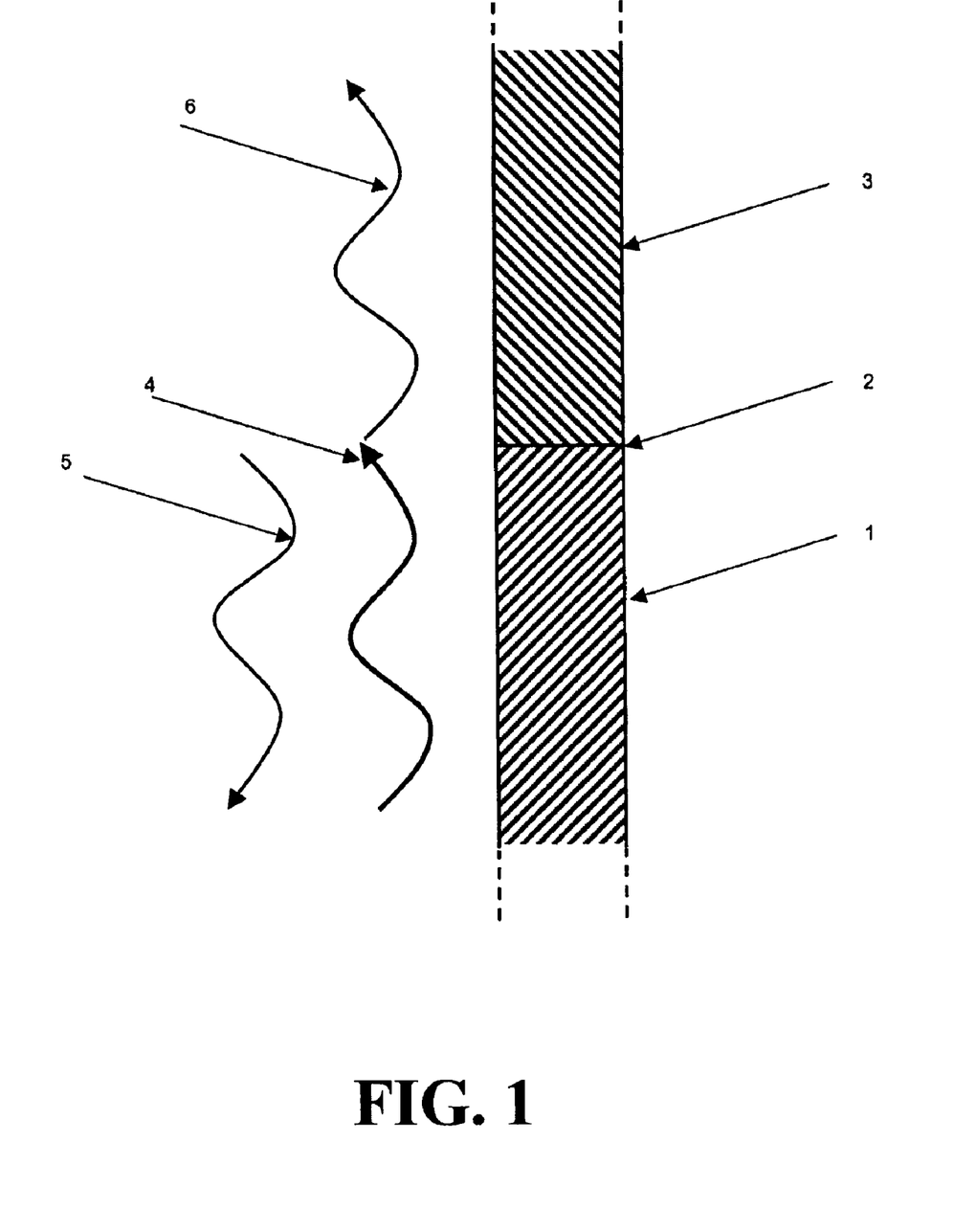
FIG. 1 is a simplified diagrammatic representation of two bars of differing acoustic impedances joined at a common interface, with an incident up wave, a transmitted up wave, and a reflected down wave travelling through them.

Referring now to FIG. 1, which illustrates a basic principle underlying the present embodiments, two pipes 1 and 3 are shown joined at a common interface 2. An incident simple wave 4 with traction amplitude I travels upwardly until it encounters the interface 2, resulting in a transmitted wave 6 with traction amplitude T and a reflected wave 5 with traction amplitude R. The acoustic impedance of pipe 1 is $z_1$, and the acoustic impedance of pipe 3 is $z_2$. The ratios connecting the reflected, transmitted, and incident tractions for this example are $$R/I = (1-K)/(1+K) \quad [2]$$

and $$T/I = 2/(1+K) \quad [3]$$

where $$K = z_1/z_2. \quad [4]$$

Three special cases can then assist in understanding the implications of this basic principle:

i) K=1 which yields R/I=0 and T/I=1

This implies the two segments have equal impedance: $z_1 = z_2$.

ii) K=∞, thus R/I=−1 and T/I=0

This implies that the interface becomes a traction-free boundary where $z_2$=0.

iii) K=0, thus R/I=+1 and T/I=2

This implies that the interface becomes a motionless rigid boundary where $z_2$=∞.

Note that in this description we refer to phase changes as they apply to tractions, not velocity amplitudes. In case i), the incident wave travels uninterrupted through the interface 2 without reflection. In case ii), the wave is completely reflected with a traction phase change of 180° and consequently the traction is zero at the interface. In case iii), the wave is completely reflected with no traction phase change and consequently the traction doubles at the interface.

Figure 2:
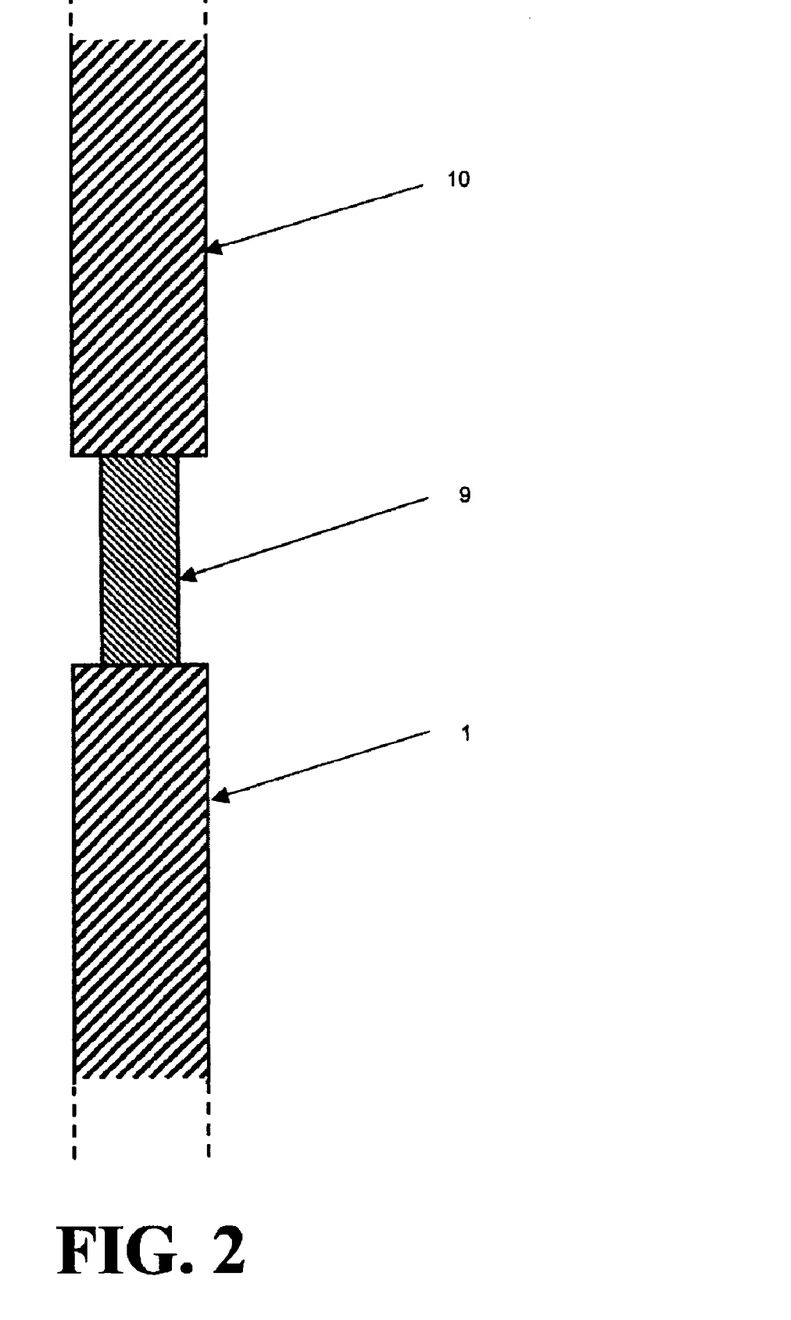
FIG. 2 is a simplified diagrammatic representation of two bars of different impedances, separated by a bar of differing impedance and $n_{odd}\lambda/4$ length.

L. M. Brekhovskikh (*Waves in Layered Media*, $2^{nd}$ ed., Academic Press, 1980) analyzes waves passing through a more complicated system, such as is illustrated in FIG. 2. Segment 1 has impedance $z_1$, segment 9 has impedance $z_2$ and a length of $n_{odd}\lambda/4$, segment 10 has impedance $z_3$. The relationships, which are similar to equations [2] and [3] for the ratios of the tractions, are:

$$R/I = (1-K_q K_s)/(1+K_q K_s) \quad [5]$$

and $$T/I = 2K_s/(1+K_q K_s) \quad [6]$$

where $$K_q = z_1/z_2 \quad [7]$$

$$K_s = z_3/z_2 \quad [8]$$

Applying equations [5] and [6] in the downhole drilling and production context can enable novel methods of implementing extremely efficient reflecting devices, particularly as a result of the $K_q$ $K_s$ terms.

EXAMPLE 1

$$K_q = K_s = K$$

Referring now to FIG. 2, three segments are illustrated: (1) a first segment 1, which is a pipe with impedance $z_1$; (2) a second segment 9, which is an $n_{odd}\lambda/4$ length pipe with impedance $z_2$; and (3) a third segment 10, which is a pipe with an impedance $z_3$ that has the same impedance $z_1$ as segment 1. In this case we see that equations [5] and [6] become:

$$R/I = (1-K^2)/(1+K^2) \quad [9]$$

and $$T/I = 2K/(1+K^2) \quad [10]$$

where we now define K to be $$K_s = K_q = (z_1/z_2) = K, \quad [11]$$

wherein $z_3 = z_1$.

Equations [9] and [10] apply to an incident wave approaching the $n_{odd}\lambda/4$ length section 9 from either direction. Where segments 1 and 10 are pipes that are standard oilfield alloy steel drill collars it is straightforward to calculate their acoustic impedance. In order to implement a significant impedance mismatch we could, for example, use a thin-walled, small diameter $n_{odd}\lambda/4$ titanium pipe for segment 9, such that the impedance $z_2$ of the segment 9 is less than that of segments 9 and 10. An attainable value for K in this circumstance would be 7.8, leading to values for R/I and T/I of −0.968 and 0.252, respectively. Considering special case ii) discussed above, it can be seen that the reflection properties of this example approach that of a traction-free boundary where the phase change is 180°. Indeed, the amplitude of the reflection is only slightly less than the ideal value of −1. Moreover, for waves approaching in either direction the titanium section 9 acoustically isolates the drill collars from each other. When segments 1 and 10 have the same impedance this isolation can be calculated as 20 $\log_{10}$(T/I), which in this case yields 12 dB reduction in the transmitted energy. This applies therefore to the boundary at the junction of segments 10/9 and segments 1/9, noting that segment 9 is of length $n_{odd}\lambda/4$. This method may be extended to stack such impedance mismatches if the isolation has to be of an even greater value.

Figure 3:
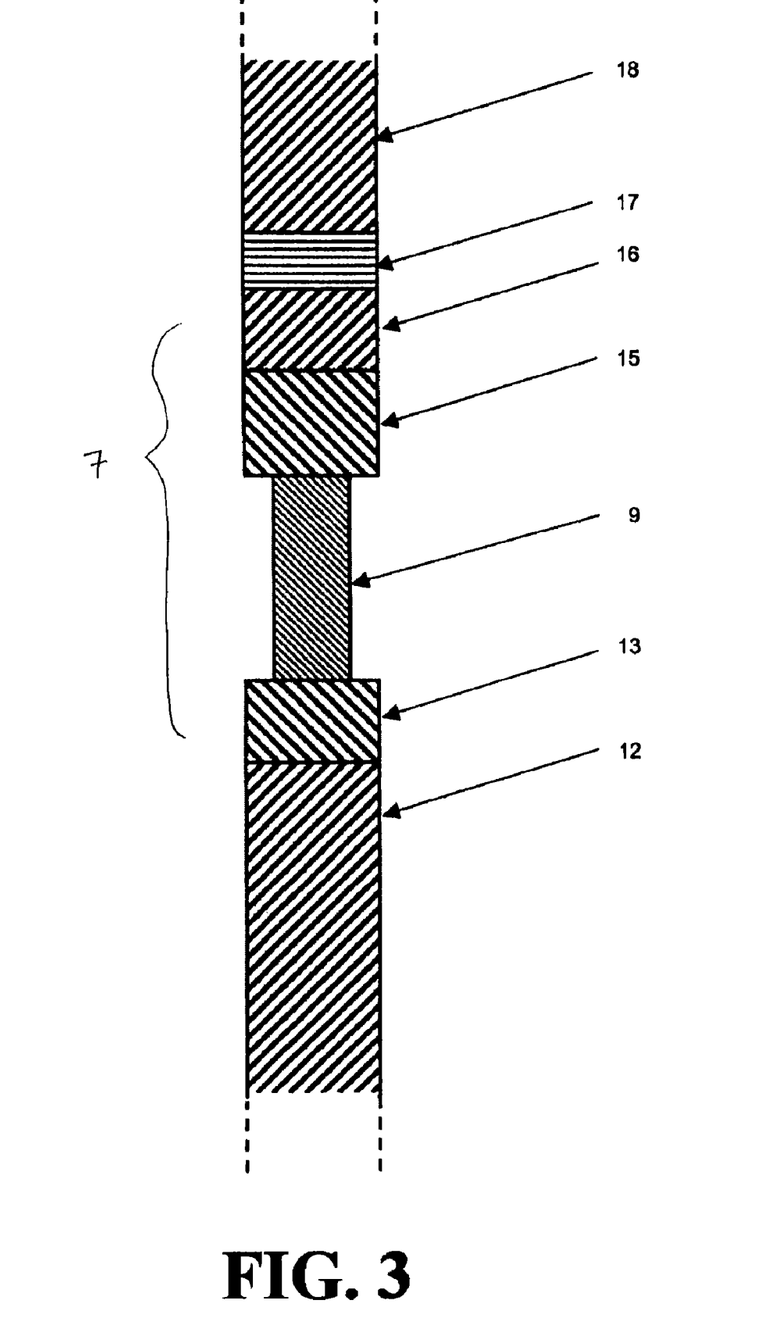
FIG. 3 is a simplified diagrammatic representation of an acoustic isolator according to an embodiment of the present invention comprising: a lead zirconium titanate (PZT) transmitter between two acoustic sub sections, a tuning bar of length $n_{odd}\lambda/4$, a reflector tube of length $n_{odd}\lambda/4$, a snubber and an extension to the rest of the BHA.

Referring now to FIG. 3 and according to one embodiment of the invention, an acoustic isolator 5 is provided according to the above and which can be applied to a more realistic downhole situation. An acoustic transmission device ('transmitter') 17, such as lead zirconium titanate (PZT) transmitter built into a drill collar 18, will transmit substantially equally in both upward and downward directions. Ideally, the components below the PZT 17 would comprise an $n_{odd}\lambda/4$ length extension terminating in a drill bit. In many instances, however, such as when drilling directional wells, this simple situation is not possible, so the exemplary embodiment taught herein is directed to further controlling the effects of the down wave, as follows.

The isolator 5 is coupled to and located immediately below the PZT transmitter 17 and comprises the following interconnected components: a drill collar extension 15 and a lower portion 16 of the same material and same acoustic impedance $z_1$ (collectively 'tuning bar'), these two items being collectively $n_{odd}\lambda/4$ in length, then follows an $n_{odd}\lambda/4$ length reflector tube 9 of lower impedance $z_2$ than segments 15/16, and next a relatively short snubber 13 having an impedance $z_3$ that is higher than the reflector tube impedance $z_2$. The snubber 13 is attached in this exemplary embodiment to the rest of the BHA 12 whose impedances and subassembly lengths are not controlled. In accordance with equation [1], the impedance mismatch between $z_1$ and $z_2$ can be obtained by selecting different materials for the tuning bar 15/16 and the reflector tube 9, such as steel and titanium, and/or by selecting a thinner reflector tube 9 wall thickness. In this embodiment, the snubber 13 is typically made out of a short section of the same type of drill collar as the tuning bar 15/16 and thus the impedance of the snubber 13 $z_3$ is the same as the tuning bar impedance $z_1$. A value of K=7.8 can be reasonably obtained using a standard diameter and wall thickness steel drill collar for tuning bar 15/16 and snubber 13 and a titanium reflector tube 9 of smaller diameter and thinner wall. Alternatively, the snubber impedance $z_3$ can have a different value so long as it is larger than the reflector tube impedance $z_2$.

It will now be clear via the application of equation [5] above that the BHA characteristics below the snubber 13 are essentially irrelevant because the tuning sections characterized by the impedance mismatches substantially and beneficially return the majority of the down wave energy from the transmitter 17 in proper phase with the original wave. This may be illustrated by considering the following situation, where for simplicity we suppose that the transmitter 17 is short so that the up and down energy appear to come from a single point and we also suppose that the $n_{odd}=1$ so that the resonant sections 15/16 and 9 are simple quarter-wavelengths. Clearly we can view this system at an instant in time so that the motion, forces, and waves are frozen in place. At this instant the transmitter 17 is radiating equal amounts of energy both up and down because it is placed between two sections of drill collar that have equal impedances. The down wave had traveled through tuning bar sections 15, 16, these sections together comprise a $\lambda/4$ section of impedance $z_1$. Thus the wave suffered a 90° phase shift by the time it reached the reflector tube 9 of impedance $z_2$. At this interface the ratio R/I (from equation 9) is negative and the wave is reflected with a phase change of 180°. It then undergoes another 90° as it upwardly returns to the transmitter 17, having undergone a net phase change of 360°. Moreover, as R/I is close to −1 (from equation 10), the amplitude of the net upward wave is effectively and beneficially doubled. The presence of the reflector tube 9 and the snubber 13 below the tuning bar 15/16 enables the application of equation [5] possible, thereby permitting the interface between segments 15 and 9 to act as if it were closely a traction-free boundary (i.e. a free surface). This being the case, it is now clear that the effect we describe is not dissimilar to simply placing a quarter-wave section immediately below the transmitter 17, with similar beneficial results, as already discussed. Without such a device being placed below the transmitter 17 the downward travelling waves could encounter one or more significant reflection interface, with a subsequent round trip phase shift possibly causing destructive interference with the upward travelling waves.

By this approach, it is a straightforward matter to account for the phase shifts and time delays due to segments and interfaces (as appropriate) comprising the transmitter 17, the lower portion 16, drill collar extension 15, the reflector tube 9 and the snubber 13 in this essentially one-dimensional structure. We also know that the small amount of energy from the transmitter that does pass through the isolator to the BHA suffers a 12 dB reduction and if it is reflected in an uncontrolled manner from the BHA 12 components below the snubber 13 it will undergo another 12 dB reduction before returning to the transmitter for a total reduction of 24 dB in the uncontrolled transmitter energy. This makes the reflection characteristics of the BHA basically irrelevant to the function of the transmitter. It will now be apparent that, as a collateral benefit, any in-band energy originating below the snubber 13 from other sources is also reflected back down where it can do no harm to the up signal being generated by the transmitter 17.

It is not obvious from the foregoing that the snubber 13 can be substantially shorter than the preceding sections with only negligible effects on the isolation, although this has been established through experimentation and the analysis method of Drumheller (see D. S. Drumheller, *Extensional stress waves in one-dimensional elastic waveguides*, J. Acoustical Society of America, 92, Dec. 1992). In other experimental embodiments snubbers as short as $\lambda/24$ have worked successfully. Tests have demonstrated the effect of varying the section lengths below the $n_{odd}\lambda/4$ length reflector tube 9, and have also shown the beneficial reflection properties of the present invention. In these tests, a sweep of frequencies has been generated that is compatible with the desired broadcast band. The centre broadcast frequency of the signal is taken to define the nominal wavelength—this being used as the measure of the various resonant reflecting components. The frequency and amplitude are normalized to this centre frequency in the following.

Figure 4:
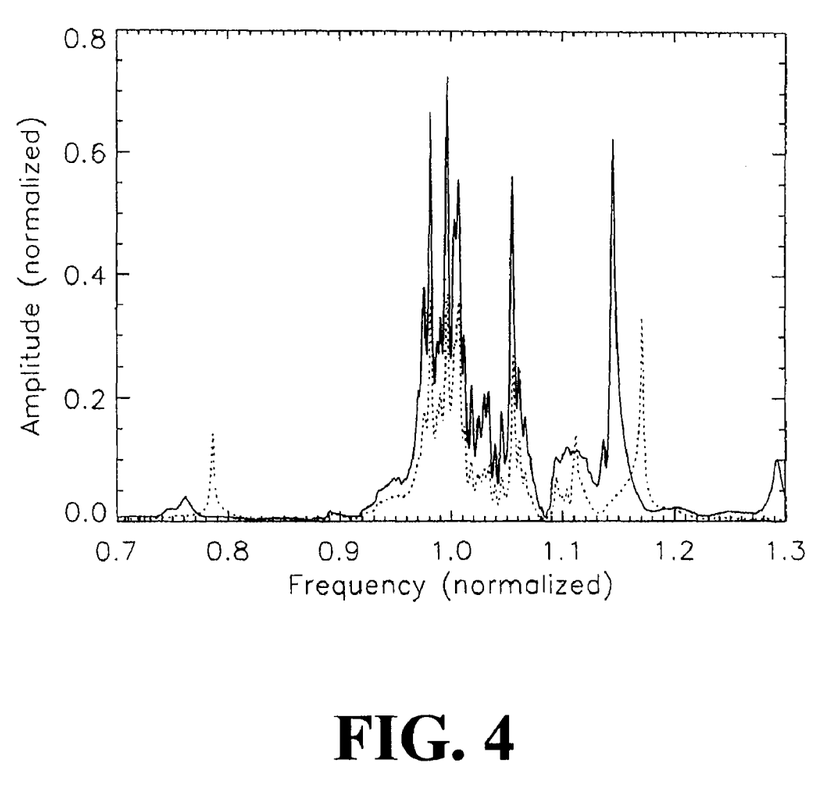
FIG. 4 is a Fourier transform plot of an accelerometer signal detecting a broadcast signal from (1) an acoustic sub attached to approximately 60 lengths of drillpipe, and then (2) with the addition to the sub of a $n_{odd}\lambda/4$ length tuning bar.

In a first test, all components below the PZT transmitter 17 were removed except for a short portion ($\lambda/12$) of the $n_{odd}\lambda/4$ length tuning bar (which happens to be an integral portion of the transmitter sub and corresponds to the lower section 16 in FIG. 3). Thus prepared, the upper part of the transmitter sub was connected to a drillstring comprising approximately 60 pipe lengths. This drillstring exhibited a well-established passband structure typical of a realistic drilling or production situation. An accelerometer was attached at the middle point of this string. The dashed line in FIG. 4 shows the Fourier transform of the accelerometer signal resulting from a broadcast from the transmitter sub. The solid line shows the effect of adding more pipe such that the optimal $n_{odd}\lambda/4$ length tuning bar was reassembled on the lower part of the sub. Several features are evident, the most important for present purposes being that the signal amplitude essentially doubled in the presence of the tuning bar. If no part of this bar had been present, the signal would have nearly disappeared.

Figure 5:
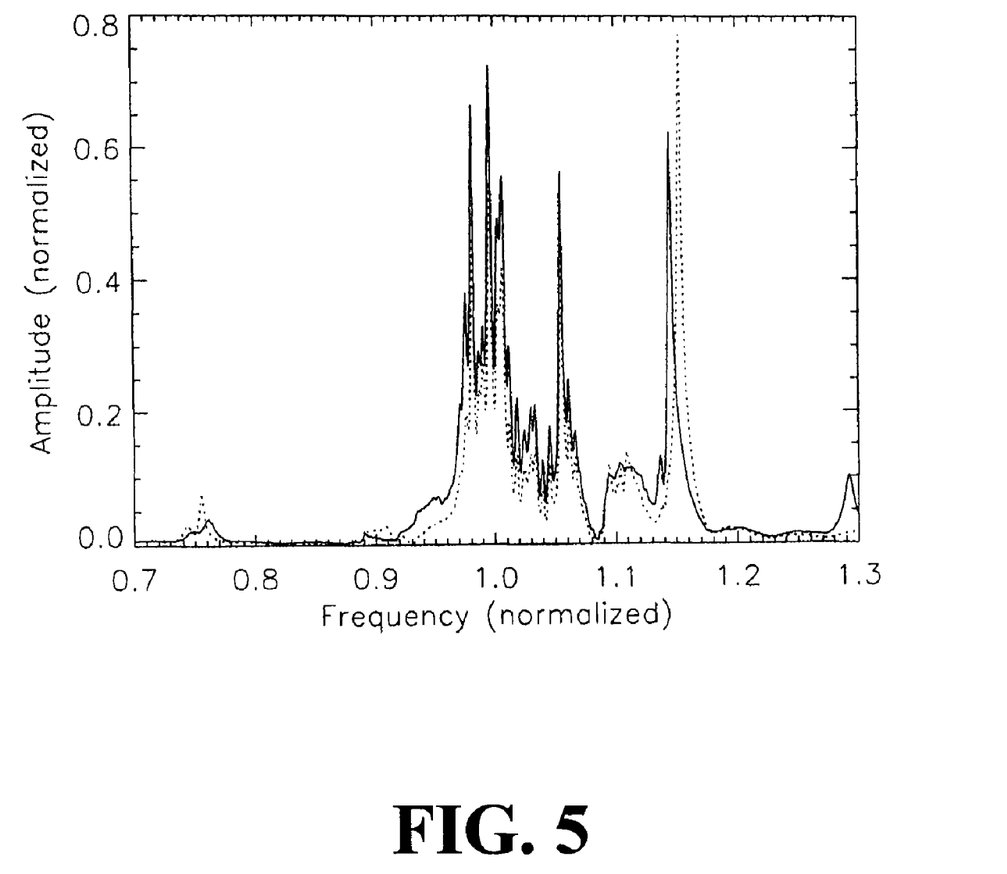
FIG. 5 is a Fourier transform plot of an accelerometer signal detecting a broadcast signal from (1) an acoustic sub alone, and then (2) with the combined addition of a $n_{odd}\lambda/4$ length tuning bar and a $n_{odd}\lambda/4$ length reflector tube attached to approximately 60 lengths of drillpipe.

FIG. 5 shows what happened when the $n_{odd}\lambda/4$ length reflector tube 9 was added to the $n_{odd}\lambda/4$ length tuning bar. The solid line is from the $n_{odd}\lambda/4$ length tuning bar alone, and the dashed line is when the $n_{odd}\lambda/4$ length reflector was added. It is evident that the addition of the reflector slightly damages the signal.

Figure 6:
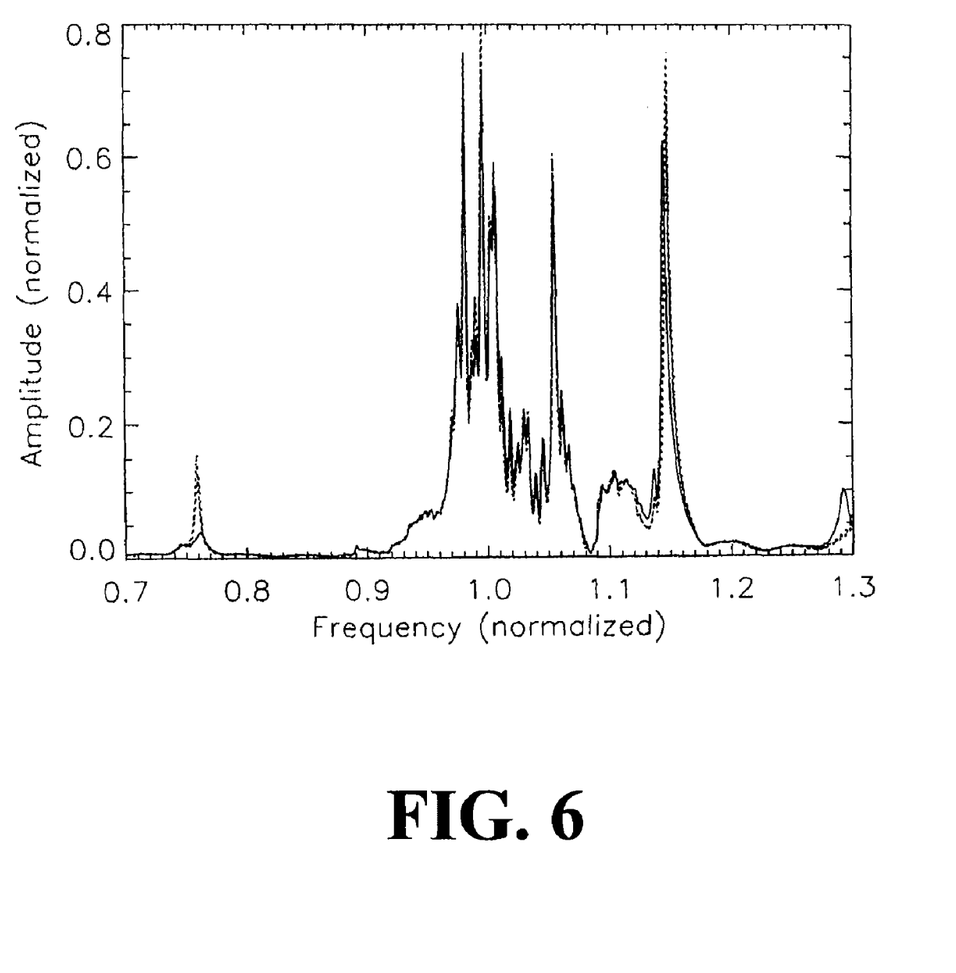
FIG. 6 is a Fourier transform plot of an accelerometer signal detecting a broadcast signal from (1) an acoustic sub alone, and then (2) with the combined addition of a $n_{odd}\lambda/4$ length tuning bar, a $n_{odd}\lambda/4$ length reflector tube and a short length of drill collar (a 'snubber') attached to approximately 60 lengths of drillpipe.

Next, the snubber was added, resulting in the dashed line seen in FIG. 6. There is little difference between this dashed line and the optimal response (solid line) of the $n_{odd}\lambda/4$ length tuning bar alone. Close inspection of FIG. 6 reveals that there are actually four dashed lines, three of which are due to successively adding $\lambda/12$ segments of bar below the snubber. These additional segments each have the same acoustic impedance as the snubber and the transmitter. Significantly, the signal is clearly unaffected by their addition, demonstrating that a broadcast response close to the optimal has been achieved and that additions of components below the snubber have minimal effect on the signal. This has been confirmed by subsequent experiments.

EXAMPLE 2

$K_q \neq K_s$

In another example, the impedance of the snubber 13 is increased, to maximize the acoustic mismatch between it and the reflector tube 9. Because one may run into practical limitations associated with increasing the wall area (see equation [1]), an alternative is to vary the material mass density $\rho$. For example, as most components of the drillstring are steel the snubber 13 may be constructed from a hollow steel housing filled with lead. An attainable impedance mismatch between a titanium reflector 9 and a denser snubber 13 is $K_s=14.3$, and as before the impedance mismatch between the $\lambda/4$ length tuning bar 15/16 and the $\lambda/4$ length reflector bar 9 is $K_q=7.8$. Equations [5] and [6] then enable calculation of R/I=−0.982 and T/I=0.254. While these numbers do not immediately indicate a significant improvement in isolation we must also recognize that we have now created another impedance mismatch between the snubber [13] and the drill collar [12] that improves the isolation. This new interface is not incorporated into equations [5] and [6] derived from the Brekovskikh analysis but we can account for it through the methods of Drumheller that show several important effects on the isolation: (1) it increases from 12 to 15.4 dB at the center broadcast frequency; (2) it improves over a broader broadcast band; and (3) it is still symmetric in that isolation of 15.4 dB applies to both upward and downward traveling waves. Consequently, wave energy from the transmitter that does make it into the BHA is now reduced by at least 30.8 dB before returning in an uncontrolled manner to the transmitter.

Significant isolation can also be achieved without resorting to a relatively expensive titanium reflector, or the use of any other material of lower density than steel (such as aluminum). Attainable impedance coefficients with a steel reflector tube and a steel-lead snubber are $K_q=4.88$ and $K_s=8.94$. This yields a value of −0.955 for R/1 and 0.400 for T/I. The Drumheller analysis predicts that the reduction of the uncontrolled transmitter energy is 23 dB when the snubber is $\lambda/8$ long and 26.4 dB when the snubber is $\lambda/4$ long as compared to 24 dB for the titanium reflector in Example 1. Clearly here the use of steel-lead snubber can replace the need for a titanium reflector. Moreover, the $\lambda/4$ snubber also offers a slight improvement in isolation but this must be weighed against the penalty of its increased mass.

As stated above, references to 'up' and 'down' waves are merely for convenience and clarity, and it is to be understood that the present invention is not limited to conceptually simple applications in acoustic communication from the downhole end of the drillstring to the surface. It will now be clear to one skilled in the art that the present invention applies equally, for example, to subsurface stations, such as would be found in telemetry repeaters, where an acoustic isolator according to the present invention can be implemented severally in a drillstring containing more than one source of acoustic energy, the sources acting in concert to extend the effective telemetry range achievable by any single acoustic source.

In summary, then: (1) the use of a tuning bar alone can essentially double the signal amplitude, but destructive outof-phase reflected waves can nullify this benefit and possibly cancel out the desired signal altogether; (2) adding a reflector tube below the tuning bar reflects some of these harmful waves, but results in signal damage; and (3) adding a snubber below the reflector tube avoids the signal damage that would otherwise be caused by the reflector tube. Embodiments of the present invention, by controlling acoustic impedance changes to provide at least two impedance mismatches, provides acoustic isolation of BHA components below the acoustic isolator, at the cost of an increase in total BHA length of only just over λ/2. This is a relatively small price to pay considering the improvement in isolation and signal amplitude, particularly when considering that the absence of the acoustic isolator may result in no signal at all being received at surface.

While a particular embodiment of the present invention has been described in the foregoing, it is to be understood that other embodiments are possible within the scope of the invention and are intended to be included herein. It will be clear to any person skilled in the art that modifications of and adjustments to this invention, not shown, are possible without departing from the spirit of the invention as demonstrated through the exemplary embodiment. For example, the tubular members (tuning bar, reflector tube, and snubber) may be formed from a single tube, the tube having various internal and external diameters along its length, which could facilitate ease of manufacture. Also, the reflector tube could be configured to contain short sections of greater external diameter in order to stabilize the isolator within the wellbore. The invention is therefore to be considered limited solely by the scope of the appended claims.

Embodiments of the invention in which an exclusive property or privilege is claimed are defined as follows:

1. An acoustic isolator for use with tubular assemblies comprising an acoustic wave transmitter, the acoustic isolator comprising, in series connection:
    a first tubular member of a first acoustic impedance connectable adjacent to the acoustic wave transmitter and having a length that is an odd multiple of a quarter wavelength (λ/4) of a representative acoustic wave;
    a second tubular member of a second acoustic impedance that is less than the first acoustic impedance and having a length that is an odd multiple of a quarter wavelength (λ/4) of the representative acoustic wave; and
    a third tubular member of a third acoustic impedance that is greater than the second acoustic impedance;
    whereby a first wave propagated by the transmitter toward the first tubular member is reflected back substantially in phase with a second wave propagated at the same time by the transmitter away from the first tubular member;
    wherein the tubular assemblies are a part of a downhole drill-string, the acoustic wave transmitter is for acoustic telemetry, the first tubular member is a tuning bar, the second tubular member is a reflector tube, and the third tubular member is a snubber.

2. An acoustic isolator as claimed in claim 1 wherein the reflector tube is composed of a material that has a lower density than the material composing the tuning bar.

3. An acoustic isolator as claimed in claim 2 wherein the reflector tube composition includes titanium and the tuning bar comprises a steel drill collar.

4. An acoustic isolator as claimed in claim 1 wherein the reflector tube has a smaller wall cross sectional area than the tuning bar.

5. An acoustic isolator as claimed in claim 4 wherein the tuning bar comprises a steel drill collar, and the reflector tube has a composition that includes steel and has a smaller wall cross sectional area than the tuning bar, thereby providing the reflector tube with a lesser acoustic impedance than the tuning bar.

6. An acoustic isolator as claimed in claim 4 wherein the tuning bar comprises a steel drill collar, and the reflector tube has a composition that is of lower density than steel and has a smaller wall cross sectional area than the tuning bar, thereby providing the reflector tube with a lesser acoustic impedance than the tuning bar.

7. An acoustic isolator as claimed in claim 1 wherein the snubber has a length shorter than λ/4 of the representative acoustic wave.

8. An acoustic isolator as claimed in claim 7 wherein the snubber comprises a steel drill collar of the same composition and wall thickness as the tuning bar.

9. An acoustic isolator as claimed in claim 1 wherein the tuning bar comprises a steel drill collar and the reflector tube has a composition that includes steel and has a smaller wall cross-sectional area than the tuning bar, and the snubber has a composition that includes steel and lead or a material with similarly or higher density than lead thereby providing the snubber with a higher acoustic impedance than the reflector tube.

10. An acoustic isolator of claim 1 wherein the acoustic impedances of the first and third tubular members are substantially equal.

11. An acoustic isolator of claim 1 wherein the third acoustic impedance is substantially different than the first acoustic impedance.

12. An acoustic isolator for use with tubular assemblies comprising an acoustic wave transmitter, the acoustic isolator comprising, in series connection:
    a first tubular member of a first acoustic impedance connectable adjacent to the acoustic wave transmitter and having a length that is an odd multiple of a quarter wavelength (λ/4) of a representative acoustic wave;
    a second tubular member of a second acoustic impedance that is less than the first acoustic impedance and having a length that is an odd multiple of a quarter wavelength (λ/4) of the representative acoustic wave; and
    a third tubular member of a third acoustic impedance that is greater than the second acoustic impedance;
    whereby a first wave propagated by the transmitter toward the first tubular member is reflected back substantially in phase with a second wave propagated at the same time by the transmitter away from the first tubular member;
    wherein the tubular assemblies are part of coiled tubing for shallow well drilling, and the acoustic wave transmitter is for acoustic telemetry, the first tubular member is a tuning bar, the second tubular member is a reflector tube, and the third tubular member is a snubber.

13. An acoustic isolator of claim 12 wherein the acoustic impedances of the first and third tubular members are substantially equal.

14. An acoustic isolator of claim 12 wherein the third acoustic impedance is substantially different than the first acoustic impedance.

15. An acoustic isolator for use with tubular assemblies comprising an acoustic wave transmitter, the acoustic isolator comprising, in series connection:
    a first tubular member of a first acoustic impedance connectable adjacent to the acoustic wave transmitter and having a length that is an odd multiple of a quarter wavelength (λ/4) of a representative acoustic wave;
    a second tubular member of a second acoustic impedance that is less than the first acoustic impedance and having a length that is an odd multiple of a quarter wavelength (λ/4) of the representative acoustic wave; and
a third tubular member of a third acoustic impedance that is greater than the second acoustic impedance;
whereby a first wave propagated by the transmitter toward the first tubular member is reflected back substantially in phase with a second wave propagated at the same time by the transmitter away from the first tubular member;
wherein the tubular assemblies are pipes used in production wells, and the acoustic wave transmitter is for acoustic telemetry, the first tubular member is a tuning bar, the second tubular member is a reflector tube, and the third tubular member is a snubber.

16. An acoustic isolator of claim 15 wherein the acoustic impedances of the first and third tubular members are substantially equal.

17. An acoustic isolator of claim 15 wherein the third acoustic impedance is substantially different than the first acoustic impedance.

* * * * *